United States Patent
Bonrath et al.

(10) Patent No.: US 12,516,009 B2
(45) Date of Patent: Jan. 6, 2026

(54) SUSTAINABLE PROCESS FOR THE MANUFACTURE OF 1,1,4,4-TETRAMETHOXY-2-BUTENE

(71) Applicant: DSM IP ASSETS B.V., Heerlen (NL)

(72) Inventors: Werner Bonrath, Kaiseraugst (CH); Roman Goy, Kaiseraugst (CH); Marcel Joray, Kaiseraugst (CH)

(73) Assignee: DSM IP ASSETS B.V., Maastricht (NL)

( * ) Notice: Subject to any disclaimer, the term of this patent is extended or adjusted under 35 U.S.C. 154(b) by 554 days.

(21) Appl. No.: 17/802,682

(22) PCT Filed: Mar. 1, 2021

(86) PCT No.: PCT/EP2021/054979
§ 371 (c)(1),
(2) Date: Aug. 26, 2022

(87) PCT Pub. No.: WO2021/170864
PCT Pub. Date: Sep. 2, 2021

(65) Prior Publication Data
US 2023/0144339 A1    May 11, 2023

(30) Foreign Application Priority Data
Feb. 28, 2020    (EP) .................................. 20160076

(51) Int. Cl.
*C07C 41/54*    (2006.01)
*C07C 41/58*    (2006.01)

(52) U.S. Cl.
CPC .............. *C07C 41/54* (2013.01); *C07C 41/58* (2013.01)

(58) Field of Classification Search
CPC ........ C07C 41/50; C07C 43/303; C07C 41/58
USPC ........................................................ 568/598
See application file for complete search history.

(56) References Cited

U.S. PATENT DOCUMENTS

| 5,338,888 A | 8/1994 | Paust et al. |
| 6,407,291 B1 | 6/2002 | Wegner et al. |
| 6,528,025 B1 | 3/2003 | Boesch et al. |

FOREIGN PATENT DOCUMENTS

| CN | 1292373 | 4/2001 |
| CN | 101967087 | 2/2011 |
| CN | 107793384 | 3/2018 |
| EP | 0 581 097 | 2/1994 |
| EP | 1 099 676 | 10/2003 |
| JP | H06-166650 | 6/1994 |
| JP | 2001-097912 | 4/2001 |
| JP | 2002-020339 | 1/2002 |
| JP | 2018-058799 | 4/2018 |
| WO | 2005/028411 | 3/2005 |
| WO | 2006/108664 | 10/2006 |

OTHER PUBLICATIONS

First Office Action, CN Application No. 202180016001.3, Sep. 8, 2023.
International Search Report and Written Opinion of the ISA for PCT/EP2021/054979 dated May 20, 2021, 13 pages.

*Primary Examiner* — Ana Z Muresan
(74) *Attorney, Agent, or Firm* — NIXON & VANDERHYE P.C.

(57) ABSTRACT

The present invention is directed to a process for the manufacture of 1,1,4,4-tetramethoxy-2-butene from 2,5-dimethoxy-2,5-dihydrofuran with methanol in the presence of an acidic ion exchanger as catalyst, whereby the molar ratio of 2,5-dimethoxy-2,5-dihydrofuran to methanol is $\geq 1{:}45$. The present invention is further directed to a process of separating 1,1,4,4-tetramethoxy-2-butene, methanol and 2,5-dimethoxy-2,5-dihydrofuran from each other and H2O whereby a basic compound, preferably a basic metal salt or a basic ion exchanger, is present. Both processes can be carried out on an industrial scale, batch-wise or in continuous mode and are sustainable since the selectivity and the space-time-yields are high and less waste compared to known processes is produced. Further objects of the present invention are the use of a basic compound in the distillation of a mixture comprising H2O, 1,1,4,4-tetramethoxy-2-butene and 2,5-dimethoxy-2,5-dihydrofuran, as well as the use of an acidic ion exchanger as catalyst in a reaction of 2,5-dimethoxy-2,5-dihydrofuran with methanol to 1,1,4,4-tetramethoxy-2-butene, whereby the molar ratio of 2,5-dimethoxy-2,5-dihydrofuran to methanol is $\geq 1{:}45$.

17 Claims, 1 Drawing Sheet

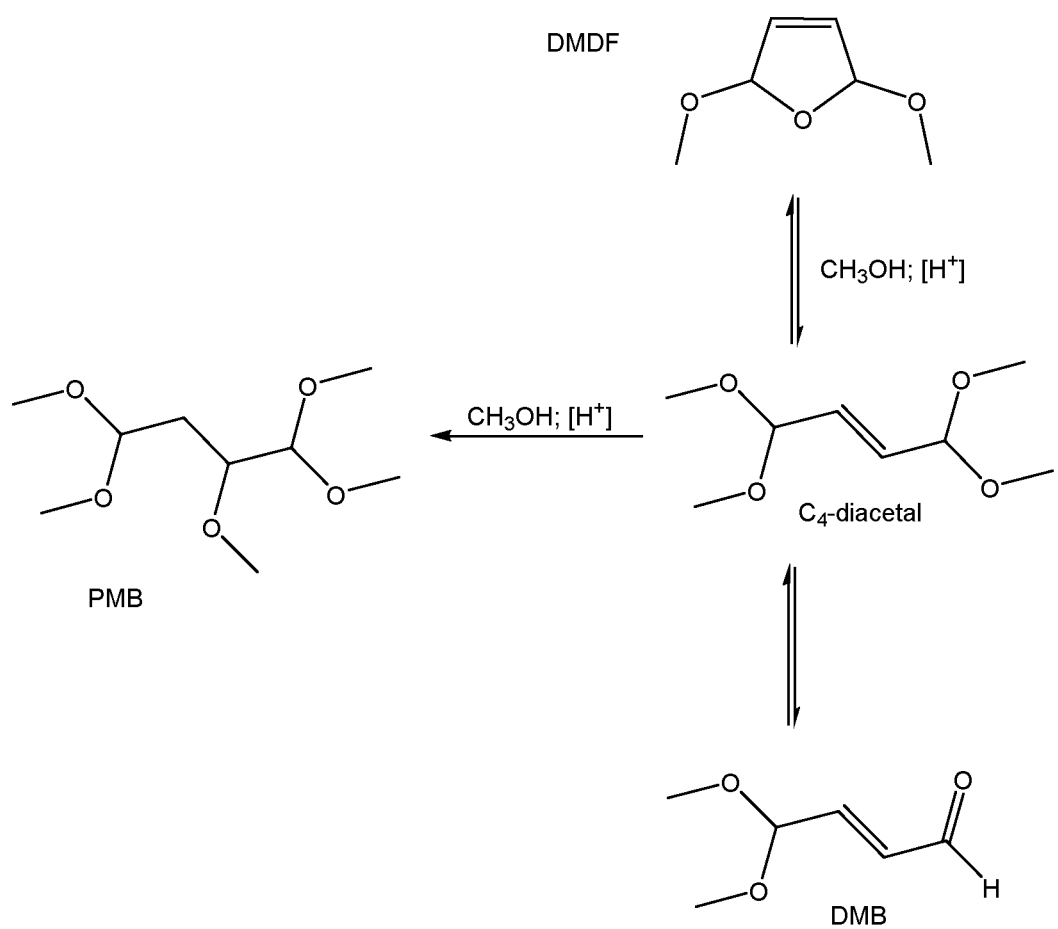

SUSTAINABLE PROCESS FOR THE MANUFACTURE OF 1,1,4,4-TETRAMETHOXY-2-BUTENE

CROSS-REFERENCE TO RELATED APPLICATIONS

This application is the U.S. national phase of International Application No. PCT/EP2021/054979 filed Mar. 1, 2021, which designated the U.S. and claims priority to EP patent application No. 20160076.4 filed Feb. 28, 2020, the entire contents of each of which are hereby incorporated by reference.

SUMMARY OF THE INVENTION

The present invention is directed to a process for the manufacture of 1,1,4,4-tetramethoxy-2-butene from 2,5-dimethoxy-2,5-dihydrofuran with methanol in the presence of an acidic ion exchanger as catalyst, whereby the molar ratio of 2,5-dimethoxy-2,5-dihydrofuran to methanol is ≥1:45. The present invention is further directed to a process of separating 1,1,4,4-tetramethoxy-2-butene, methanol and 2,5-dimethoxy-2,5-dihydrofuran from each other and $H_2O$ whereby a basic compound, preferably a basic metal salt or a basic ion exchanger, is present.

Both processes can be carried out on an industrial scale, batch-wise or in continuous mode and are sustainable since the selectivity and the space-time-yields are high and less waste compared to known processes is produced.

Further objects of the present invention are the use of a basic compound in the distillation of a mixture comprising $H_2O$, 1,1,4,4-tetramethoxy-2-butene and 2,5-dimethoxy-2,5-dihydrofuran, as well as the use of an acidic ion exchanger as catalyst in a reaction of 2,5-dimethoxy-2,5-dihydrofuran with methanol to 1,1,4,4-tetramethoxy-2-butene, whereby the molar ratio of 2,5-dimethoxy-2,5-dihydrofuran to methanol is ≥1:45.

BACKGROUND OF THE INVENTION 1,1,4,4-Tetramethoxy-2-butene (called "$C_4$-diacetal" in the following) is an important intermediate in the synthesis of 2,7-dimethyl-2,4,6-octanetriene-1,8-dialdehyde (so-called "$C_{10}$-dialdehyde"), which is needed for the chemical synthesis of carotenoids as e.g. already described in CN 108 752 178 A.

$C_4$-diacetal may be manufactured by the reaction of methanol with 2,5-dimethoxy-dihydrofuran (called "DMDF" in the following) in the presence of a catalyst as shown in FIG. 1. Undesired by-products are PMB (1,1,2,4,4-pentamethoxybutane) or DMB (4,4-dimethoxy-but-2-enal) (see also FIG. 1).

The process according to EP-A 1 099 676 uses solid catalysts having acid centers for this reaction. Disadvantageously PMB is produced in an amount of at least 1.5% (see e.g. example 5), based on the amount of the starting material DMDF.

In the processes described in WO 2006/108664 and EP 581 097 the acetalization agent trialkyl orthoformate has to be used which makes these processes more expensive and thus, non-economic and not sustainable.

As already stated above all these known processes have certain disadvantages. It is therefore an object of the present invention to provide a process not being troubled with such disadvantages.

Furthermore, there is a rising demand of increasing the efficiency and sustainability of industrial chemical processes to decrease negative environmental impact with respect to waste to a minimum.

BRIEF DESCRIPTION OF THE DRAWING

FIG. 1 shows the reaction of methanol with 2,5-dimethoxy-dihydrofuran (DMDF) in the presence of a catalyst to manufacture $C_4$-diacetal with undesired by-products being 1,1,2,4,4-pentamethoxybutane (PMB) or 4,4-dimethoxy-but-2-enal (DMB).

DETAILED DESCRIPTION OF THE INVENTION

These needs are fulfilled by the present invention, which is directed to a process ("PROCESS 1") for the manufacture of 1,1,4,4-tetramethoxy-2-butene (=$C_4$-diacetal) comprising the following steps:
a) providing 2,5-dimethoxy-2,5-dihydrofuran, which optionally contains 1,1,4,4-tetramethoxy-2-butene;
b) reacting said 2,5-dimethoxy-2,5-dihydrofuran, whereby optionally 1,1,4,4-tetramethoxy-2-butene is present, provided in step a) with methanol, in the presence of an acidic ion exchanger as catalyst, whereby optionally water is present, to a mixture comprising $H_2O$ and 1,1,4,4-tetramethoxy-2-butene until at most 79% of 2,5-dimethoxy-2,5-dihydrofuran have been reacted to 1,1,4,4-tetramethoxy-2-butene, whereby the molar ratio of 2,5-dimethoxy-2,5-dihydrofuran to methanol is ≥1:45;
c) optionally adding a basic compound to the mixture comprising $H_2O$, methanol, 1,1,4,4-tetramethoxy-2-butene and 2,5-dimethoxy-2,5-dihydrofuran;
d) distilling said mixture comprising $H_2O$, methanol, 1,1,4,4-tetramethoxy butene, 2,5-dimethoxy-2,5-dihydrofuran in the presence of said basic compound to separate these compounds from each other, whereby 1,1,4,4-tetramethoxy-2-butene, methanol and un-reacted 2,5-dimethoxy-2,5-dihydrofuran are obtained;
whereby either a basic compound is added to the mixture in step c) or a basic compound is present during the distillation of step d).

In a preferred embodiment of PROCESS 1 un-reacted 2,5-dimethoxy-2,5-dihydrofuran obtained in step d) is recycled back into step a) or b), respectively, thus adding to the sustainability of the process.

The single steps are disclosed in more detail below.

Step a)

Preferably the amount of $C_4$-diacetal is <1 mol-%, more preferably <0.5 mol %, most preferably <0.1 mol-%, related to the amount of DMDF.

Step b)

Preferably the reaction is carried out in continuous mode in reactors as known to the person skilled in the art. Especially preferred are fixed-bed or tube reactors or tube bundle reactors.

The reaction is preferably performed at a temperature in the range of from 0 to 50° C., more preferably at a temperature in the range of from 10 to 30° C., most preferably at a temperature in the range of from 15 to 25° C., and/or preferably at atmospheric pressure.

Catalyst

In a preferred embodiment the catalyst used in step b) is an acidic ion exchanger having a concentration of acid sites of at least 2.5 eq/kg, preferably at least 3.0 eq/kg, more preferably at least 4.0 eq/kg, most preferably 5.0 eq/kg. If an acidic ion exchanger is used which has a lower concentration of acid sites than 2.5 eq/kg, the selectivity and the turn-over are still high, but the reaction time is longer (see example 1F compared to the examples 1A-1E).

In a more preferred embodiment the catalyst is an acidic ion exchanger containing sulfonic acid groups and having a concentration of acid sites of at least 2.5 eq/kg, preferably at least 3.0 eq/kg, more preferably at least 4.0 eq/kg, most preferably 5.0 eq/kg.

Surprisingly it has been found that the use of acidic ion exchangers with the preferences as given above that have a certain particle size distribution and a certain water retention capacity results in an even higher selectivity towards the product, i.e. the $C_4$-diacetal.

Such preferred catalysts are either acidic ion exchangers having a particle size distribution ≥400 µm and a water retention capacity <60%, preferably a water retention capacity in the range of from 40 to 60%, more preferably a water retention capacity in the range of from 50 to 60%, or acidic ion exchangers having a particle size distribution <400 µm and a water retention capacity >60%, preferably a water retention capacity in the range of from 60 to 80%, more preferably a water retention capacity in the range of from 60 to 75%.

The acidic ion exchangers showed a high activity over a long period of time. Nevertheless, if their activity is decreasing, they may be re-activated by washing with a polar organic solvent, preferably by washing with methanol, or by washing with a protic organic solvent or by washing with a protic inorganic solvent such as an acid.

The person skilled in the art will choose the amount of the catalyst, i.e. the bed volume, according to the amount of the reaction mixture.

Any acidic ion exchanger with one or more of the preferred characteristics as given above can successfully be employed in the process of the present invention.

The most preferred acidic ion exchangers have all preferred characteristics as given above.

Amount of Methanol

The molar ratio of 2,5-dimethoxy-2,5-dihydrofuran to methanol in step b) is preferably in the range of from 1:45 to 1:100, more preferably in the range of from 1:50 to 1:90, even more preferably in the range of from 1:60 to 1:80, most preferably in the range of from 1:70 to 1:80.

Conversion Rate

Preferably the reaction is carried out until at most 75% of DMDF have been reacted to $C_4$-diacetal, more preferably until 20 to 72% of DMDF have been reacted to $C_4$-diacetal, even more preferably until 35 to 70% of DMDF/40 to 65% of DMDF/45 to 60% of DMDF, respectively, have been reacted to $C_4$-diacetal, most preferably until 50 to 60% of DMDF have been reacted to $C_4$-diacetal.

Absence of an Acetalization Agent Except Methanol

In a preferred embodiment of the present process no acetalization agent except methanol is present. Especially excluded is the use of trialkyl orthoformate as used in the processes of EP 581 097 and WO 2006/108664, since the use of trialkyl orthoformate leads to the formation of methyl formate which adds to the waste produced in the process. Since no acetalization agent except methanol is present in the process of the present invention, the amount of waste is minimized.

Since $H_2O$ is formed during the reaction which facilitates the return reaction to the starting materials, as well as the reaction to the by-product DMB, the amount of $H_2O$ is preferably below a certain level to still guarantee a sufficient turn-over. It has been found that the amount of water when stopping the reaction of step b) is preferably in the range of from 0 to 100 mol %, more preferably in the range of from 20 to 80 mol %, most preferably in the range of from 30 to 65 mol %, related to the amount of 2,5-dimethoxy-2,5-dihydrofuran.

The combination of steps c) and d) is also an invention. Thus, the present invention is also directed to a process ("PROCESS 2") of separating 1,1,4,4-tetramethoxy butene (=$C_4$-diacetal), methanol and 2,5-dimethoxy-2,5-dihydrofuran (=DMDF) from a mixture comprising $H_2O$, methanol, 1,1,4,4-tetramethoxy-2-butene and 2,5-dimethoxy-2,5-dihydrofuran comprising the following steps:
  i) providing a mixture comprising $H_2O$, methanol, $C_4$-diacetal, DMDF and optionally a basic compound;
  ii) optionally adding a basic compound to said mixture;
  iii) distilling said mixture comprising $H_2O$, methanol, $C_4$-diacetal and DMDF in the presence of said basic compound to separate methanol, $C_4$-diacetal and DMDF from each other;

whereby either a basic compound is already present in the mixture provided in step i) or a basic compound is added in step ii).

Step c and d)/Step i) and ii), Respectively

The starting mixture comprises preferably <70 mol-% of DMDF, more preferably DMDF in an amount in the range of from 20 to 70 mol-%, even more preferably DMDF in an amount in the range of from 30 to 60 mol-%, most preferably DMDF in an amount in the range of from 40 to 50 mol-%, based on the total amount of C4-diacetal and DMDF.

The amount of $C_4$-diacetal in the starting mixture is preferably >30 mol-%, more preferably it is in the range of from 30 to 80 mol-%, even more preferably it is in the range of from 40 to 70 mol-%, most preferably it is in the range of from 50 to 60 mol-%, based on the total amount of $C_4$-diacetal and DMDF.

The amount of water in the starting mixture is preferably >30 mol-%, more preferably it is in the range of from 30 to 80 mol-%, even more preferably it is in the range of from 40 to 70 mol-%, most preferably it is in the range of from 50 to 60 mol-%, based on the total amount of $C_4$-diacetal, $H_2O$ and DMDF.

Preferably the basic compound is a heterogenous basic compound, more preferably it is a basic metal salt or a basic ion exchanger or a mixture thereof, most preferably the basic compound is a basic ion exchanger. Advantageously the basic compound can be recycled.

In general any basic salt being soluble in methanol is suitable. Such salts are e.g. alkali, alkaline earth and ammonium salts soluble in methanol. Preferred examples of such salts are potassium carbonate, sodium carbonate and diammonium hydrogen phosphate, whereby potassium and sodium carbonate are preferred. Also mixtures of these salts, especially of these preferred salts, may be used.

Basic ion exchangers encompass strong anion exchange resins containing hydroxy groups or the corresponding salts.

The amount of said basic compound is preferably in the range of from 0.01 to 1 weight-%, more preferably in the range of from 0.02 to 0.75 weight-%, even more preferably in the range of from 0.03 to 0.5 weight-%, most preferably in the range of from 0.03 to 0.3 weight-%, based on the total weight of the reaction mixture comprising methanol, $H_2O$, $C_4$-diacetal and DMDF.

A higher amount of basic compound may be used, but leads to more waste making the process less sustainable.

The presence of the basic compound prevents the loss of desired product (=$C_4$-diacetal) and un-reacted starting material (=DMDF) during distillation of the mixture. By the presence of the basic compound the loss of both compounds, $C_4$-diacetal and DMDF, could be reduced to an amount of less than 7 mol-%, preferably to an amount of less than 5 mol-%.

Step iii

Step iii) is preferably performed at a temperature in the range of from 20 to 180° C., more preferably at a temperature in the range of from 30 to 150° C., most preferably at a temperature in the range of from 40 to 110° C., and/or preferably at a pressure in the range of from 0.1 to 1013 mbar, more preferably at a pressure in the range of from 0.5 to 500 mbar, most preferably at a pressure in the range of from 1 to 100 mbar.

The present invention encompasses any combination of one or more preferred embodiments as mentioned above of the PROCESSES 1 and 2.

Further embodiments of the present invention are the use of a basic compound as defined above in the distillation of a mixture comprising $H_2O$, 1,1,4,4-tetramethoxy-2-butene and 2,5-dimethoxy-2,5-dihydrofuran, and the use of an acidic ion exchanger as catalyst in a reaction of 2,5-dimethoxy-2,5-dihydrofuran with methanol to 1,1,4,4-tetramethoxy-2-butene, whereby the molar ratio of 2,5-dimethoxy-2,5-dihydrofuran to methanol is ≥1:45.

The invention is now further illustrated in the following non-limiting examples.

EXAMPLES

The following acidic ion exchangers are tested:

Acidic Ion Exchanger

Amberlyst 15WET (commercially available from Dupont Water Solutions—DDP Specialty Products Germany GmbH Et Co. KG, Neu-Isenburg, Germany): macroporous; particle size distribution: 400-1200 μm; water retention capacity: 52-57%; concentration of acid sites: 5 equivalents per kg of ion exchanger;

Amberlyst 46 (commercially available from Dupont Water Solutions—DDP Specialty Products Germany GmbH Et Co. KG, Neu-Isenburg, Germany): macroporous; particle size distribution: 400-1200 μm; water retention capacity: 26-36%; concentration of acid sites: 1 equivalents per kg of ion exchanger;

Dowex88H (commercially available from Dupont Water Solutions—DDP Specialty Products Germany GmbH Et Co. KG, Neu-Isenburg, Germany): macroporous; particle size distribution: 300-1200 μm; water retention capacity: 42-48%; concentration of acid sites: 5 equivalents per kg of ion exchanger;

Dowex50WX4 50-100 mesh (commercially available from Dupont Water Solutions—DDP Specialty Products Germany GmbH Et Co. KG, Neu-Isenburg, Germany): gel; particle size distribution: 200-400 μm; water retention capacity: 64-72%; concentration of acid sites: 5 equivalents per kg of ion exchanger;

Dowex50WX4 16-25 mesh (commercially available from Dupont Water Solutions—DDP Specialty Products Germany GmbH Et Co. KG, Neu-Isenburg, Germany): gel; particle size distribution: 400-1200 μm; water retention capacity: 64-72%; concentration of acid sites: 5 equivalents per kg of ion exchanger;

Dowex50WX4 200-400 mesh (commercially available from Dupont Water Solutions—DDP Specialty Products Germany GmbH Et Co. KG, Neu-Isenburg, Germany): gel; particle size distribution: 37-74 μm; water retention capacity: 64-72%; concentration of acid sites: 5 equivalents per kg of ion exchanger.

Basic Ion Exchanger

Amberlyst A26 (commercially available from Dupont Water Solutions—DDP Specialty Products Germany GmbH Et Co. KG, Neu-Isenburg, Germany): particle size distribution: 560-700 μm; water retention capacity: 66-75%; surface area: 30 m²/g (Nitrogen BET); pore diameter: 290 Å.

Examples 1A-H: Acid-Catalyzed Conversion of DMDF to $C_4$-Diacetal

The reactor is filled with 50 mm glass wool, then an acidic ion exchanger (=catalyst) according to Table 1-3 is added. Then methanol is pumped through the catalyst bed until the solvent is colorless. A solution of DMDF (408 mmol) in methanol (1250 ml, 31.2 mol) is prepared and pumped through the catalyst bed at different temperatures (11-21° C.) and flowrates (1-24 mL/min). Samples are taken after a flow of three bed volumes under constant conditions. The starting solution as well as the samples are analyzed with gas chromatography.

TABLE 1 various acidic ion exchangers tested under similar conditions

| Example | Catalyst | Bed time [min] | Temperature [° C.] | Conversion [%] | Selectivity [%] | Yield [%] | PMB [%] |
|---|---|---|---|---|---|---|---|
| 1A | Dowex88H | 17 | 21 | 53 | 93 | 49 | 0.0 |
| 1B | Amberlyst 15WET | 18 | 21 | 52 | 98 | 51 | 0.0 |
| 1C | Dowex 50WX4 200-400 mesh | 16 | 21 | 46 | 93 | 42 | 0.0 |
| 1D | Dowex 50WX4 50-100 mesh | 8 | 21 | 47 | 94 | 44 | 0.0 |
| 1E | Dowex 50WX4 16-25 mesh | 8 | 21 | 42 | 91 | 38 | 0.0 |
| 1F | Amberlyst 46 | 38 | 21 | 46 | 94 | 44 | 0.0 |

TABLE 2

Amberlyst 15WET tested under various catalyst bed retention times

| Example | Bed time [min] | Temperature [° C.] | Conversion [%] | Selectivity [%] | Yield [%] | PMB [%] |
|---|---|---|---|---|---|---|
| 1G | 9 | 21 | 39.4 | 98.7 | 39 | 0.0 |
| 1B | 18 | 21 | 52.3 | 97.9 | 51 | 0.0 |

TABLE 3

Amberlyst 15WET tested under various reaction temperatures

| Example | Bed time [min] | Temperature [° C.] | Conversion [%] | Selectivity [%] | Yield [%] | PMB [%] |
|---|---|---|---|---|---|---|
| 1H | 18 | 11 | 28.0 | 99.9 | 28 | 0.0 |
| 1B | 18 | 21 | 52.3 | 97.9 | 51 | 0.0 |

Examples 2A-E: Acid-Catalyzed Conversion of DMDF to $C_4$-Diacetal

The reactor is filled with 50 mm glass wool and the acidic ion exchanger Amberlyst 15WET (=catalyst) is added. Then methanol is pumped through the catalyst bed until the solvent is colorless. A solution of DMDF (408 mmol) in methanol (1250 ml, 31.2 mol) is prepared and pumped through the catalyst bed at 21° C. and a flowrate of 4 mL/min. Samples are taken after certain periods. The starting solution as well as the samples are analyzed with gas chromatography. As shown in Table 4 below the catalyst showed a constant high selectivity even after more than 70 hours.

TABLE 4

Amberlyst 15WET: long-term stability at constant reaction conditions

| Example | Experiment time [hours] | Conversion [%] | Selectivity [%] | Yield [%] | PMB [%] |
|---|---|---|---|---|---|
| 2A | 1.5 | 54.5 | 97.2 | 53 | 0.0 |
| 2B | 8.0 | 54.5 | 98.5 | 54 | 0.0 |
| 2C | 29.2 | 56.1 | 95.2 | 53 | 0.0 |
| 2D | 50.6 | 52.9 | 98.8 | 52 | 0.0 |
| 2E | 71.0 | 52.8 | 97.8 | 52 | 0.0 |

Examples 3A-E: Acid-Catalyzed Conversion of a Mixture of DMDF and $C_4$-Diacetal to $C_4$-Diacetal The reactor is filled with 50 mm glass wool and the acidic ion exchanger Amberlyst 15WET (=catalyst) is added. Then methanol is pumped through the catalyst bed until the solvent is colorless. A solution of DMDF (408 mmol) and various amounts of $C_4$-Diacetal (0-142.8 mmol) in methanol (1250 ml, 31.2 mol) is prepared and pumped through the catalyst bed of Amberlyst 15WET at 20° C. and various flowrates (2-14 mL/min). Samples are taken after certain periods. The starting solution as well as the samples are analyzed with gas chromatography. The results are shown in Table 5.

TABLE 5

Amberlyst 15WET-catalyzed conversion of a mixture of DMDF and $C_4$-diacetal to $C_4$-diacetal

| Example | $C_4$-diacetal [mmol] | Bed time [min] | Conversion [%] | Selectivity [%] | Yield [%] | PMB [%] |
|---|---|---|---|---|---|---|
| 3A | 0 | 18 | 54 | 98 | 53 | 0.0 |
| 3B | 40.8 | 18 | 57 | 95 | 54 | 0.0 |
| 3C | 61.2 | 18 | 58 | 97 | 56 | 0.0 |
| 3D | 102.0 | 12 | 57 | 94 | 54 | 0.0 |
| 3E | 142.8 | 12 | 61 | 95 | 58 | 0.0 |

The selectivity is still high in the presence of $C_4$-diacetal.

Examples 4A-B: Acid-Catalyzed Conversion of a Mixture of DMDF, $C_4$-Diacetal and $H_2O$ to $C_4$-Diacetal The reactor is filled with 50 mm glass wool and the acidic ion exchanger Amberlyst 15WET (=catalyst) is added. Then methanol is pumped through the catalyst bed until the solvent is colorless. A solution of DMDF (408 mmol), $C_4$-Diacetal (142.8 mmol) and $H_2O$ (0 or 1224 mmol) in methanol (1250 ml, 31.2 mol) is prepared and pumped through the catalyst bed of Amberlyst 15WET at 22° C. with a residence time of 18 minutes. Samples are taken after certain periods. The starting solution as well as the samples are analyzed with gas chromatography. The results are shown in Table 6.

TABLE 6

| Example | $C_4$-diacetal [mmol] | $H_2O$ [mmol] | Conversion [%] | Selectivity [%] | Yield $C_4$-diacetal [%] | PMB [%] |
|---|---|---|---|---|---|---|
| 4A | 142.8 | 0 | 66.0 | 93.0 | 61 | 0.0 |
| 4B | 142.8 | 1224 | 27.3 | 91.7 | 25 | 0.0 |

If water is present in an amount of 3 times of the amount of DMDF, the conversion of DMDF to $C_4$-diacetal decreases.

Examples 5A-D: Stability Tests of DMDF and C4-Diacetal in the Presence of Water During Distillation A 2000 mL round bottom flask was filled with DMDF (245 mmol), $C_4$-Diacetal (245 mmol) and $H_2O$ (0 or 1000 mmol) in methanol (1000 ml, 25 mol) and an additional basic compound was added according to Table 7. The reaction mixture was evaporated at 70° C./700 mbar to a certain amount. The evaporated solution and starting solution are analyzed with gas chromatography. The results are shown in Table 7.

TABLE 7

| Example | Mass of solution [g] | Basic compound [g] | $C_4$-diacetal [mmol] | DMDF [mmol] |
|---|---|---|---|---|
| 5A | 887 | none | 249 | 245 |
| 5A(ev) | 175 | none | 245 | 242 |
| 5B | 863 including 18 g of $H_2O$ (=1000 mmol = 1 mol) | none | 249 | 245 |
| 5B(ev) | 167 | none | 150 | 215 |
| 5C | 881 including 18 g of $H_2O$ (=1000 mmol = 1 mol) | 0.5 $K_2CO_3$ | 246 | 244 |
| 5C(ev) | 253 | 0.5 $K_2CO_3$ | 244 | 245 |
| 5D | 883 including 18 g of $H_2O$ (=1000 mmol = 1 mol) | 2.0 g Amberlyst A26 | 245 | 244 |
| 5D(ev) | 157 | 2.0 g Amberlyst A26 | 237 | 244 |

5A-5D are the starting solutions.

"ev" means that the corresponding sample had been evaporated until the amount as given in Table 7 remained.

Sample 5A (887 g) e.g. contained originally 249 mmol of $C_4$-diacetal and 245 mmol of DMDF; the rest being methanol. When the solvent had been evaporated (=sample "5A (ev)"), 245 mmol of $C_4$-diacetal (98.4% of original amount) and 242 mmol of DMDF (98.8% of original amount) could be retrieved.

When, however, water had been present in the starting solution and no basic compound (see examples 5B and 5B(ev), respectively), then only 150 mmol of $C_4$-diacetal (60.3% of original amount) and 215 mmol of DMDF (87.8% of original amount) could be retrieved; thus leading to a substantial loss of the desired product (=$C_4$-diacetal) and the non-reacted starting material (=DMDF).

This loss could be prevented by the presence of the basic compound—see examples 5C/5C(ev) and 5D/5D(ev), respectively:

In the presence of 0.5 g of $K_2CO_3$ in the starting solution 5C, after evaporation 244 mmol of $C_4$-diacetal (99.2% of original amount) and 245 mmol of DMDF (100.4% of the original amount*) could be retrieved.

* In the presence of the basic compound, the by-product DMB is reacted to DMDF so that more DMDF is retrieved than originally present.

In the presence of 2.0 g of the basic ion exchanger Amberlyst A26 in the starting solution 5D, after evaporation 237 mmol of $C_4$-diacetal (96.7% of original amount) and 244 mmol of DMDF (100% of original amount) could be retrieved.

The invention claimed is:

1. A process for manufacturing 1,1,4,4-tetramethoxy-2-butene comprising the following steps:
    a) providing 2,5-dimethoxy-2,5-dihydrofuran (DMDF optionally comprising 1,1,4,4-tetramethoxy-2-butene;
    b) reacting the DMDF optionally comprising 1,1,4,4-tetramethoxy-2-butene provided in step a) with methanol in a molar ratio of the DMDF to methanol being ≥1:45, in the presence of an acidic ion exchanger as catalyst and optionally in the presence of water, with a mixture comprising water and 1,1,4,4-tetramethoxy-2-butene until at most 79% of DMDF has been reacted to 1,1,4,4-tetramethoxy-2-butene to obtain a reaction mixture comprising water, methanol, 1,1,4,4-tetramethoxy-2-butene and DMDF;
    c) bringing the reaction mixture comprising water, methanol, 1,1,4,4-tetramethoxy-2-butene and DMDF into contact with a basic compound;
    c) distilling the reaction mixture comprising water, methanol, 1,1,4,4-tetramethoxy-2-butene and DMDF in the presence of the basic compound to thereby separate these compounds from each other and obtain 1,1,4,4-tetramethoxy-2-butene, methanol and un-reacted DMDF, wherein
    step c) is practiced by adding the basic compound to the reaction mixture obtained in step b) or before or during the distillation of step d), and wherein
    the process is conducted in the absence of any acetalization agent except for the presence of the methanol.

2. The process according to claim 1, which further comprises recycling the un-reacted DMDF obtained in step d) back into either step a) or step b), respectively.

3. The process according to claim 1, wherein the catalyst used in step b) is an acidic ion exchanger having a concentration of acid sites of at least 2.5 eq/kg, and/or wherein the catalyst used in step b) is an acidic ion exchanger containing sulfonic acid groups and having a concentration of acid sites of at least 2.5 eq/kg.

4. The process according to claim 3, wherein the acidic ion exchanger has a particle size distribution ≥400 μm and a water retention capacity <60%.

5. The process according to claim 3, wherein the acidic ion exchanger has a particle size distribution <400 μm and a water retention capacity >60%.

6. The process according to claim 1, wherein the reaction in step b) is carried out at a temperature in a range from 0 to 50° C. and/or at atmospheric pressure.

7. The process according to claim 1, wherein the reaction of step b) is carried out until at most 75% of the DMDF has been reacted to 1,1,4,4-tetramethoxy-2-butene.

8. The process according to claim 1, wherein the molar ratio of the DMDF to methanol in step b) is in a range from 1:45 to 1:100.

9. The process according to claim 1, wherein the process is conducted in the absence of trialkyl orthoformate.

10. The process according to claim 1, wherein when the reaction of step b) is stopped, water is present in a range from 0 to 100 mol % in relation to the amount of DMDF.

11. A process of separating 1,1,4,4-tetramethoxy-2-butene, methanol and 2,5-dimethoxy-2,5-dihydrofuran (DMDF) from a mixture comprising water, methanol, 1,1,4,4-tetramethoxy-2-butene and DMDF, the process comprising the following steps:
    i) providing a reaction mixture comprising water, methanol, 1,1,4,4-tetramethoxy-2-butene, and DMDF;
    ii) bringing the reaction mixture into contact with a basic compound; and
    iii) distilling the reaction mixture comprising water, methanol, 1,1,4,4-tetramethoxy-2-butene and DMDF in the presence of a basic compound to separate methanol, 1,1,4,4-tetramethoxy-2-butene and DMDF from each other, wherein
    step ii) is practiced either by providing the reaction mixture of step i) with the basic compound or adding the basic compound to the reaction mixture before or during the distillation according to step iii), and wherein
    the reaction mixture contains no acetalization agent other than the methanol, and wherein
    the basic compound is a basic metal salt, a basic ion exchanger or a mixture thereof and is present in an amount in a range from 0.03 to 0.3 weight-%, based on the total weight of the reaction mixture.

12. The process according to claim 11, which further comprises recycling the basic compound which is separated from the methanol, 1,1,4,4-tetramethoxy-2-butene and DMDF.

13. The process according to claim 12, wherein the basic ion exchanger is a strong anion exchange resin containing hydroxy groups or the corresponding salts.

14. The process according to claim 12, wherein the basic metal salt is an alkali, alkaline earth and/or ammonium salt soluble in methanol.

15. The process according to claim 11, wherein step iii) is performed at a temperature in a range from 20 to 180° C. and/or at a pressure in a range from 0.1 to 1013 mbar.

16. The process according to claim 11, wherein the process is carried out continuously.

17. The process according to claim 1, wherein the process is carried out continuously.

* * * * *